Oct. 11, 1955   D. H. KEISER, JR   2,720,024
OPERATING MEANS FOR SHEARS
Filed Jan. 7, 1953
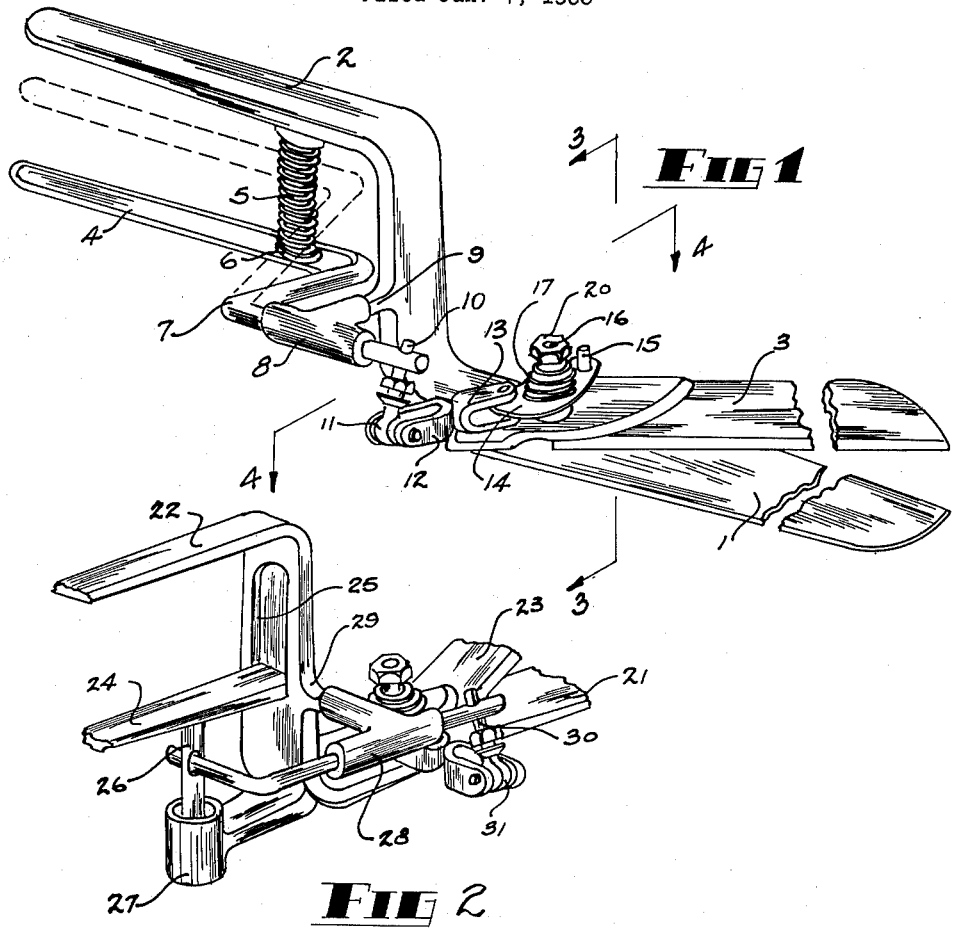
INVENTOR.
DAVID HOWARD KEISER JR.
BY
William J. Ruano
ATTORNEY

United States Patent Office 2,720,024
Patented Oct. 11, 1955

2,720,024

OPERATING MEANS FOR SHEARS

David Howard Keiser, Jr., West Lawn, Pa.

Application January 7, 1953, Serial No. 329,964

4 Claims. (Cl. 30—248)

My invention relates generally to shears and, more specifically, to improvements applicable to the type of shears shown in my prior Patent No. 2,607,114 dated August 19, 1952, and to the so called "push cut" shears covered by my co-pending application, now Patent No. 2,661,534 dated December 8, 1953 (Figs. 10 to 15). My invention is directed to the type of shears commonly known as clipper grass shears in which one cutting blade is fixed and the other is movable (however, it is to be understood that both blades may be movable). My improvement relates more specifically to the handle construction and handle operated motion transmitting means to enable the shears to be operated with minimum manual labor.

In conventional types of grass shears the handles are pivotally connected together and are generally provided with a spring therebetween to bias the handles apart. The blades are brought together by grasping the handles and pivotally moving them toward each other, and thereafter allowing the spring to push the handles apart as well as the blades. The disadvantage of such pivotally connected handles is that because of the angularity between handles most of the manual effort in pulling the blades together is exerted on the fore finger resulting in tiring and blistering of the fore finger as the result of grass cutting, but with relatively little tiring and no blistering of the remaining fingers. This comes from unnatural grasping of the fingers and from concentration of effort on the fore finger since it is adjacent a portion of the handle which is closest to the other handle. Thus, the gardener's hand becomes fatigued after a relatively short period and makes cutting a laborious undertaking.

Another contributing factor to the manual effort required to operate grass shears is the friction developed between the relatively movable blades and the tendency of clogging of grass between blades.

An object of my invention is to provide a novel type of handle construction and operating means for shears, particularly grass shears, in order to considerably reduce the manual effort required to operate the shears, therefore making it possible to double or triple the amount of grass cut, as compared with conventional shears, before the operator's hand becomes so fatigued as to make further grass cutting very tiresome.

A more specific object of my invention is to provide handles for shears which are connected so as to be constantly maintained in parallel relationship instead of being angularly movable by a pivotal connection therebetween, so that by such parallel movement a more natural motion of the fingers is obtained and an equal distribution of effort among all fingers is secured instead of concentration of effort on the fore finger as prevalent in the operation of conventional grass shears, thus providing amazingly greater ease in cutting.

A further object of my invention is to provide, in grass shears having a non-binding pivotal connection between the shears for insuring proper cooperating pressure engagement of the blade cutting edges during their closing movement, a roller bearing extension for not only preventing separation of the blades during cutting movement but for considerably reducing the frictional resistance of the cutting blades as they are moved together or apart.

Other objects and advantages of my invention will become apparent from a study of the following description taken with the accompanying drawing wherein:

Figure 1 is a perspective view of grass shears embodying the principles of my invention, Figure 2 is a fragmentary perspective view of a modified form of handle construction for operating the shears, Figure 3 is an enlarged fragmentary side view taken along line 3—3 of Figure 1 and more clearly showing the roller on the rear extension of the blade to serve as bearing point and for reducing friction of the blades, and Figure 4 is a fragmentary plan view of the pivotal portion of the blades shown in Figure 1.

Referring more particularly to Figure 1 of the drawing, numeral 1 denotes a stationary blade of a pair of grass cutting shears having integrally connected thereto an L shaped element forming a stationary handle 2. The movable blade 3 is operated by means of a movable handle 4 through mechanism to be described in detail hereinafter. Handle 4 is disposed in parallel relationship to the stationary handle 2. A helical spring 5 is disposed between handles 2 and 4 so as to normally bias them apart. The ends of spring 5 are seated in cups, such as 6, integrally secured to the respective handles.

Movable handle 4 is provided with an integral crank extension 7 the end of which is journaled in bearing 8 which is in the form of a stationary hollow cylinder having a lateral extension integrally secured to a lateral extension 9 of stationary handle 2. Handle 4 has no other connection to handle 2. At the forward end of crank extension 7 a diametrical hole is provided through which extends a pin 10 held by a cotter pin (not shown), to one end of which pin 10 there is integrally connected an eye 11. Eye 11 is connected to one end of a link, somewhat in the form of a turnbuckle comprising U-shaped ends 12 and 13 which are held together by a threaded stud (not shown). The end 13 of the link is pin-connected to one arm of a bell crank 14. The other arm of bell crank 14 has a hole through which there extends a pin 15 whose lower end is rigidly secured to the movable blade 3.

The bell crank 14 is adapted to be pivotally rocked about a pivot post 16 whose lower end is integrally secured to the stationary blade 1. A helical spring 17 surrounds post 16 and is interposed between the bell crank 14 and the nut 20 which adjusts the tension of the spring 17.

In operation, the movable handle 4 is grasped by the four fingers of the operator and the stationary handle 2 by the palm and thumb. Then handle 4 is moved in parallel relationship toward handle 2 against the action of spring 5 and will be maintained in parallel relationship by virtue of the fact that the forward end of crank extension 7 is journaled in bearing 8. The turning of the forward end of crank extension 7 will effect rocking movement of eye 11 about the axis of bearing 8 as a pivot and will push laterally inwardly the link comprising turn buckle end portions 12 and 13, which, in turn, will effect rocking of bell crank 14 about the vertical axis of pivot post 16. This, in turn, will effect a push on pin 15 which will push the movable blade 3 to the closed position.

Of course, when the movable handle 4 is released, the tension of spring 5 will push it away from stationary handle 2 while continually maintaining parallel relationship between handles 2 and 4, and at the same time moving the linkage connection between the crank extension 7 and movable blade 3 in a direction opposite to that described so as to move blade 3 apart from stationary blade 1.

As will be more apparent from Figure 3, the movable blade 3 has a rearward extension 18 in a form of a pin, on the end of which is rotably mounted a roller 19 which rolls on the top surface of the rear portion of the stationary blade 1. Extension 18 and roller 19 have a dual function, namely, to provide a rearwardly extending bearing point to prevent lateral spreading apart of the forward ends of the blades, such as when clogged with grass, also to provide an almost frictionless bearing point between the rear extensions of the fixed and movable blades, thus considerably reducing the manual effort required to move the blades together.

Figure 2 shows a modification of the parallel handle construction wherein the stationary blade 21 has an integral vertical offset terminating in stationary handle 22, and wherein the movable blade 23 is operated by means of movable handle 24 which is constantly in parallel relationship with the stationary handle 22. One end of handle 24 is guided within a slot 25. To the lower central portion of movable handle 24 there is integrally secured a plunger rod 26 which reciprocates in a stationary cylindrical portion 27 integrally secured to the stationary handle offset. A helical spring (not shown) may be either placed inside of cylinder 27 surrounding rod 26, or between handles 22 and 24 to normally bias the handles apart. A crank extension, loosely pivoted on rod 26 and journaled in cylinder 28 secured to extension 29, effects rocking of pin 30 and movement in a lateral direction with respect to the shears of the turnbuckle link to effect operation of the movable blade 23 in substantially the same manner as described in connection with Figure 1.

While one handle in each of Figures 1 and 2 is shown as being stationary it should be noted that both of the handles may be movable instead if so desired.

Thus it will be seen that I have provided an efficient handle construction for shears embodying handles which are maintained in parallel relationship throughout the entire operating movement of the blades and providing an amazing reduction in manual effort to operate the shears, thus making it possible to do more cutting of grass, or the like, without excessive tiring of the hand, particularly the fore finger as caused by conventional shears; furthermore, I have provided a novel operating linkage and substantially frictionless rolling engagement between the rear relatively slidable extensions of the blades to further reduce manual operating effort and thus considerably increase the efficiency of the shears; furthermore I have provided shears, which are particularly useful as grass shears, of relatively simple construction, having simple and inexpensive parts to manufacture or assemble which provide long life as well as extreme ease of operation and high cutting efficiency of the shears.

While I have illustrated and described certain specific embodiments of my invention, it will be understood that these are by way of illustration only, and that various changes and modifications may be made within the contemplation of my invention and within the scope of the following claims.

I claim:

1. Shears for cutting grass and the like, comprising a stationary blade having an integral, vertically upwardly extending offset at the rear end thereof and a handle integrally secured to said offset in parallel relationship to said stationary blade, a movable handle extending in parallel relationship to said stationary handle and having a laterally extending crank portion at one end thereof which is journaled at right angles to said offset in a manner so that said movable handle will move in parallel relationship with said stationary handle, a movable blade, linkage means connecting said crank to said movable blade, and spring means normally biasing said handles apart, whereby said handles will be maintained in constant parallel relationship throughout the entire operation of the shears.

2. Shears for cutting grass and the like, comprising a pair of relatively movable blades and a pair of relatively movable handles for operating said blades, said handles mounted in parallel relationship to each other and operable in a plane at right angles to the plane of said blades, the forward end of one handle having an extension which is journaled on the other handle and constituting the sole connection between said handles and disposed so that the handles will be maintained in constant parallel relationship throughout the entire operation of the shears.

3. Shears for cutting grass and the like, comprising relatively movable blades, a pair of relatively movable handles disposed and movable in a direction at right angles to the blades for operating said blades, a pivot post extending through at least one of said blades for providing a pivotal axis for relative movement between said blades, a spring surrounding said pivot post, a nut on said post for adjusting the tension of said spring, there being a loose connection on said pivot post to permit the movable blade to tilt laterally relative the stationary blade against the action of said spring, one of said blades having a rear extension, a roller mounted on said extension and held in rolling contact with a rear extension of the other blade and held there against by said spring so as to prevent lateral separation of the forward portions of the blade and to considerably reduce friction caused by relative sliding movement of the blades.

4. Grass shears comprising a stationary blade and an L shaped handle element integrally secured to the rear end of said blade to form a stationary handle which is parallel to said blade, a bearing element integrally secured to said L-shaped element, a movable handle extending in parallel relationship to said stationary handle and having a laterally extending crank extension forwardly thereof which is journaled to a side extension of said bearing element in a manner so as to provide parallel movement of said handles, a helical spring normally biasing said handles apart, a pivot post about which said blades are pivoted, a bell crank pivotally mounted on said post, linkage means connecting the forward end of said crank extension to one arm of said bell crank, a pin integrally secured to one of said blades and extending through a hole in the other arm of said bell crank, whereby said parallel movement between said handles will effect opening and closing movements of said blades about said pivot post as an axis.

References Cited in the file of this patent
UNITED STATES PATENTS

| | | |
|---|---|---|
| 1,324,598 | Koehler | Dec. 9, 1919 |
| 2,407,237 | Keiser | Sept. 10, 1946 |
| 2,672,684 | Kalish | Mar. 23, 1954 |